United States Patent [19]

Sakai et al.

[11] 4,304,339
[45] Dec. 8, 1981

[54] FUEL TANK CAP

[75] Inventors: Yoshiharu Sakai, Atsugi; Hidetoshi Ogida, Fukushima, both of Japan

[73] Assignee: Nihon Radiator Co., Ltd., Tokyo, Japan

[21] Appl. No.: 127,951

[22] Filed: Mar. 7, 1980

Related U.S. Application Data

[63] Continuation of Ser. No. 909,925, May 26, 1978, abandoned.

[30] Foreign Application Priority Data

Jun. 9, 1977 [JP] Japan .................................. 52-74302
Apr. 14, 1978 [JP] Japan .................................. 53-48256

[51] Int. Cl.³ .......................................... B65D 51/16
[52] U.S. Cl. .................................. 220/209; 220/203; 220/DIG. 33; 220/295
[58] Field of Search ............. 220/295, 203, 205, 209, 220/208, 304, DIG. 32, DIG. 33

[56] References Cited

U.S. PATENT DOCUMENTS

| 1,809,186 | 6/1931 | Stant | 220/DIG. 32 |
| 2,406,502 | 8/1946 | Lines | 220/203 |
| 2,484,083 | 10/1949 | Hindley | 220/203 |
| 2,679,946 | 6/1954 | Friend | 220/304 |
| 3,061,138 | 10/1962 | Edelmann et al. | 220/203 |
| 3,938,692 | 2/1976 | Crute | 220/203 |
| 4,051,975 | 10/1977 | Ohsida et al. | 220/203 |
| 4,081,102 | 3/1978 | Sakai | 220/295 |

Primary Examiner—Joseph Man-Fu Moy
Attorney, Agent, or Firm—Gordon W. Hueschen

[57] ABSTRACT

A fuel tank cap comprising a cover, a bracket, an annular sealing member disposed around a cylindrical portion of said bracket, an annular retainer sandwiched between said cover and said annular sealing member, and an annular gasket sandwiched between said bracket and said retainer, the outer surface of said annular retainer being substantially coextensive in shape with the outer surface of said gasket, and one of the peripheral edge portions of said gasket having a projection held in locking engagement with said annular retainer.

5 Claims, 10 Drawing Figures

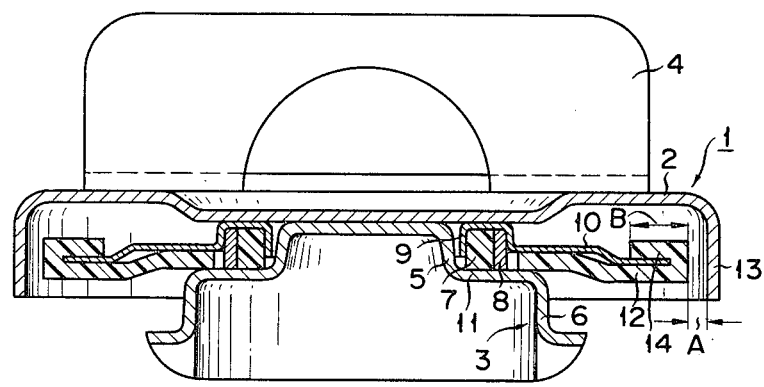
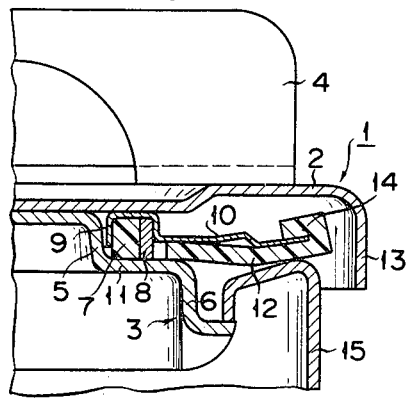
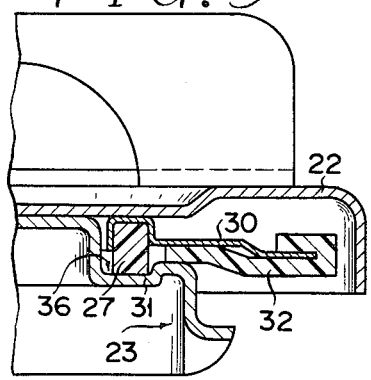
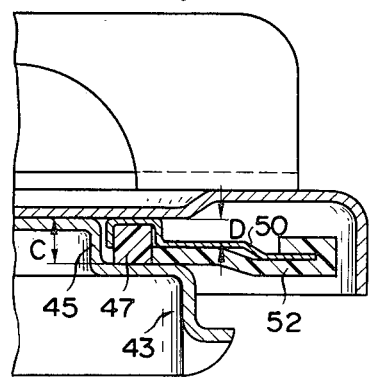
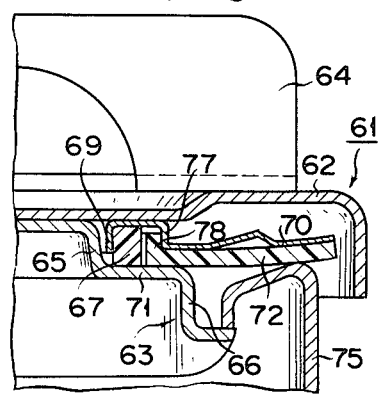

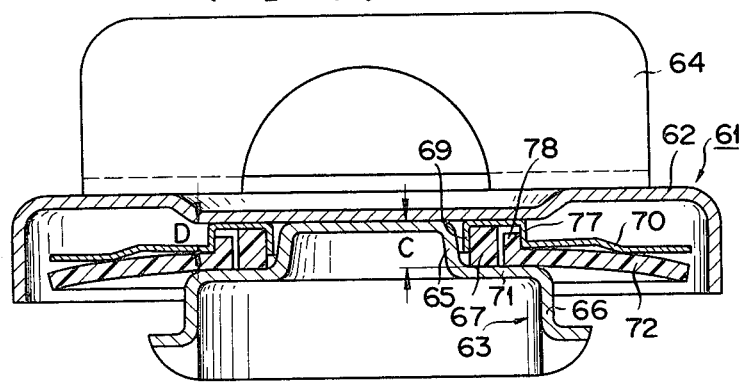
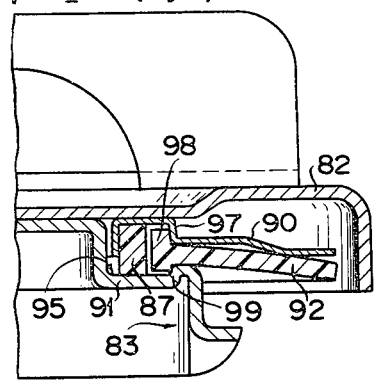
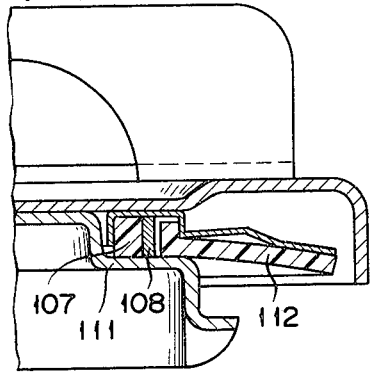
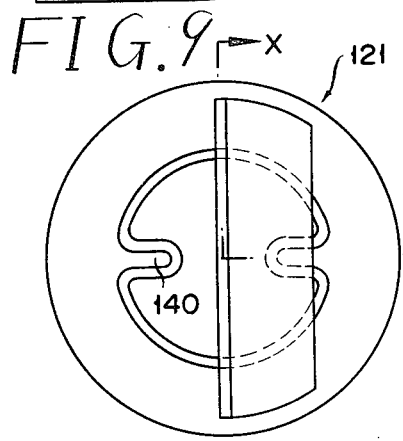
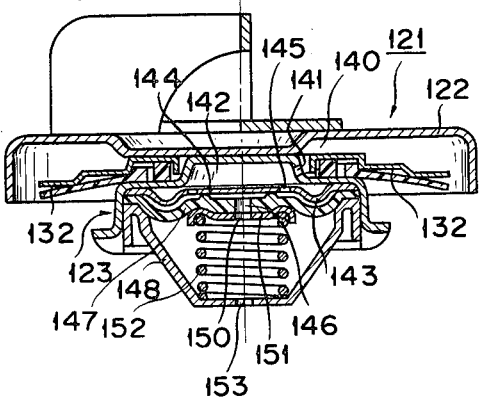

FUEL TANK CAP

This is a continuation of application Ser. No. 909,925, filed May 26, 1978 now abandoned.

BACKGROUND OF THE INVENTION

1. Field of the Invention

The present invention relates to a fuel tank cap for use on a filler neck of an automotive fuel tank, and more particularly to such fuel tank cap having enhanced airtight and liquid-tight characteristics.

2. Prior Art

Gaskets and sealing members for conventional fuel tank caps for automobiles are usually made of synthetic rubbers such as nitrile-butadiene rubber (hereinafter referred to NBR) that has been widely used for its inexpensiveness. However, such NBR gaskets are much more likely to swell and to suffer from resultant defects when submerged in hydrocarbons such as gasoline than would be if gaskets were made of fluorinated rubber or fluorosilicone rubber which is relatively costly. Accordingly, when the gasoline comes into contact with the NBR gasket of the cap mounted on the fuel filler neck, the gasket swells and its peripheral portion becomes hung down or dangled. Such dangled peripheral portion tends to be folded over on itself during re-installation of the cap on the filler neck, with the result that fuel leakage can occur through the cap. Further, the swollen gasket is prone to become shifted from a support bracket and thus to be held against the filler neck out of the proper position, allowing the fuel to be spilled. Sealing rubber members when swollen are liable to be placed out of a retainer and the bracket, thereby causing fuel leakage.

SUMMARY OF THE INVENTION

Accordingly, an object of the present invention is to provide a fuel tank cap having enhanced air-and liquid-tightness.

Another object of the present invention is to provide a fuel tank cap having a gasket and a sealing member which are free of deficiencies from contact with the fuel in the tank.

According to the present invention, a fuel tank cap comprising a cover, a bracket, an annular sealing member disposed around a cylindrical portion of said bracket, an annular retainer sandwiched between said cover and said annular sealing member, and an annular gasket sandwiched between said bracket and said retainer, the outer surface of said annular retainer being substantially coextensive is shape with the outer surface of said gasket and one of the peripheral edge portions of said gasket having a projection held in locking engagement with said annular retainer.

BRIEF DESCRIPTION OF THE DRAWINGS

The present invention will be understood best in connection with the accompanying drawings wherein;

FIG. 1 is a vertical cross-sectional view of a fuel tank cap constructed in accordance with an embodiment of the invention;

FIG. 2 is a fragmentary vertical cross-sectional view of the fuel tank cap of FIG. 1 mounted on a filler neck;

FIG. 3 is a fragmentary vertical cross-sectional view of a modified fuel tank cap;

FIG. 4 is a fragmentary vertical cross-sectional view of another modified fuel tank cap;

FIG. 5 is a fragmentary vertical cross-sectional view still another modification;

FIG. 6 is a fragmentary vertical cross-sectional view of the fuel tank cap of FIG. 5 installed on a filler neck;

FIG. 7 is a fragmentary vertical cross-sectional view of a modified fuel tank cap;

FIG. 8 is a fragmentary vertical cross-sectional view of another modified fuel tank cap;

FIG. 9 is a plan view of a fuel tank cap according to another embodiment of the invention; and FIG. 10 is a vertical cross-sectional view taken along line X—X' of FIG. 9.

DETAILED DESCRIPTION

As shown in FIG. 1, a fuel tank cap 1 comprises a cover 2 and a bracket 3 having a top portion rigidly fixed to the cover as by welding or brazing. The cover 2 has a handle or knob 4 secured to the upper surface thereof. The bracket 3 is of a stepped configuration having an upper cylindrical portion 5 and a lower cylindrical portion 6, the cylindrical portions being interconnected by an annular horizontal shoulder 11. An annular sealing member 7 made of a synthetic rubber such is NBR is disposed around the upper cylindrical portion 5. Around the annular sealing member 7, there is fitted a support ring 8 the purpose of which is not to seal but to prevent the sealing member from being displaced out of its position, the ring being preferably made of a metal such as steel, brass or aluminum, or a synthetic resin such as nylon 11, nylon 12 or polyacetal.

An annular retainer 10 acting as a leaf spring is sandwiched between the cover 2 and the sealing member 7 and the ring 8, the retainer including a flange 9 projecting along the inner periphery of the sealing member 7. An annular gasket 12 made preferably of a synthetic rubber such as NBR is sandwiched between the annular retainer 10 and the shoulder 11 of the bracket 3. The outer surface of the retainer 10 and the inner surface of the annular gasket 12 are substantially coextensive in shape with each other. The gasket 12 has an outer peripheral edge portion which is inturned over the upper portion of the retainer 10. The inturned lip 14 has a width B larger than the distance A between the annular gasket 12 and the skirt 13 of the cover 2.

FIG. 2 shows the cap of FIG. 1 mounted on a fuel filler neck 15.

According to a modified fuel tank cap shown in FIG. 3, any ring for preventing displacement of a sealing member 27 is dispensed with, and an annular shoulder 31 of the sealing member 27 has an annular groove 36 in which the annular sealing member 27 is disposed. The sealing member 27 is sandwiched between the shoulder 31 and a cover 22 together with a retainer 30 against bulging out of the sealing member 27 even when it is swelled. A gasket 32 is turned up over the upper portion of the retainer 30 in fitting relation therewith.

A modified fuel tank cap shown in FIG. 4 is similar to the cap of FIG. 1 except that no support ring for a sealing member 47 is used. The height D between the top of an annular retainer 50 and the flat portion of the cap is larger than one half of the length C of an upper cylindrical portion 45 of a bracket 43. A gasket 52 is turned up over the upper portion of the retainer 50 in fitting relation therewith.

FIG. 5 illustrates another modification in which a fuel tank cap 61 conprises a cover 62 and a bracket 63 having a top portion rigidly fixed to the cover as by welding or brazing. The cover 62 has a handle or knob 64 secured to the upper surface thereof. The bracket 63 is of a stepped configuration having an upper cylindrical portion 65 and a lower cylindrical portion 66, the cylindrical portions being interconnected by an annular shoulder 71. An annular sealing member 67 is disposed around the upper cylindrical portion 65. Between the annular sealing member 67 and the cover 62, there is sandwiched a retainer 70 having a flange 69 projecting downwardly along the inner periphery of the annular sealing member 67, the retainer having an annular wall 77 located centrally, thereof and extending downwardly, and acting, as a leaf spring extending substantially horizontally outwardly from the lower end of the annular wall 77. An annular gasket 72 is interposed between the shoulder 71 of the bracket 63 and the retainer 70. The outer surface of the retainer 70 is substantially coextensive in shape with the annular gasket 72, and the inner peripheral edge portion of the gasket 72 has an integral annular lip 78 extending upwardly. Accordingly, the annular lip 78 of the gasket 72 is held in a space provided between the flange 69 of the retainer 70 and the annular wall 77, and engages the inner surface of the annular wall 77, the gasket 72 being sandwiched between the shoulder 71 and the retainer 70. The sealing member 67 and the gasket 72 are made of a synthetic rubber such for example as NBR. The height D between the top of the retainer 70 and the flat portion thereof is larger than one half of the length C of the upper cylindrical portion 65 of the bracket 63 for better results.

FIG. 6 illustrates the cap shown in FIG. 5 installed on a fuel tank filler neck 75.

According to a modified fuel tank cap of FIG. 7, an annular shoulder 91 of a bracket 63 has an annular groove 95 in which is inserted an annular sealing member 87 sandwiched between the shoulder 91 and a cover 82 with a retainer 90 therebetween, thereby holding the sealing member 87 against bulging when swelled. A gasket 92 has on its inner peripheral edge portion an integral annular lip 98 extending upwardly and downwardly, and held in engagement with an annular wall 97 of the retainer 90 and an outer edge 99 that bounds the groove 95.

A modification shown in FIG. 8 is similar to the fuel tank cap of FIGS. 5 and 6, and further includes a ring 108 placed on an annular shoulder 111 and disposed between an annular sealing member 107 and a gasket 112.

Although fuel tank caps with no valves equipped have been described above, the present invention is applicable to fuel tank caps which are equipped with a conventional pressure relief valve or vacuum relief valve, in which case such fuel tank caps are similarly air-tight and liquid-tight.

More specifically, FIGS. 9 and 10 show a fuel tank cap equipped with a vacuum relief valve, the fuel tank cap being substantially identical in structure with that illustrated in FIGS. 5 and 6. A cover 122 is provided with one or more air passageways 140 between itself and a retainer 132, leading to a bracket 123 where there are apertures 141 through which air around a cap 121 can flow via the apertures 141 into a chamber 142 in the bracket 123. The bracket 123 contains a seat plate 144 having an annular projection 143 projecting downwardly. The seat plate 144 has through holes 145 formed in its flat area near its peripheral. Positioned beneath the seat plate 144 is a diaphragm 147 made of a flexible material such as rubber, the diaphragm 147 having a central bore 146 and being held at its circumference upwardly agianst the bracket 123 and the seat plate 144 by an upper edge of a cup-shaped member 149. The diaphragm 147 has a contour substantially identical with that of the seat plate 144, but has an annular land 149 disposed around the central bore 146. A compression coil spring 152 acts between the cup-shaped member 148 and a spring seat 151 which is held against the lower surface of the diaphragm 147 and has a central opening 150 that is in registration with the bore 146 in the diaphragm 147. Thus, the diaphragm 147 is normally urged against the lower surface of the seat plate 144 by the spring 152. The cup-shaped member 148 held at its upper edge against the inner surface of the bracket 123.

With the arrangement as described above, the fuel tank caps according to the present invention are prevented from becoming hung down or displaced out of position even when swelled by contact with hydrocarbons such as gasoline. Further, the sealing members when swelled by contact with gasoline are held in position against being bulged outwardly by means of the ring, the annular wall of the retainer, or the groove in the bracket shoulder. Therefore, no inproper installation is experienced at all timer with the tank fuel caps using a cheaper rubber such as NBR than fluorinated rubber or fluorosilicone rubber. Air-tight and liquid-tight characteristics of the fuel tank caps are greatly enhanced in this manner.

What is claimed is:

1. A fuel tank cap comprising a cover, a bracket having a cylindrical portion depending from said cover and an annular shoulder projecting outwardly from said cylindrical portion; an annular sealing member disposed around said cylindrical portion between said cover and said annular shoulder; and annular retainer having an inner portion, a central portion, and an outer portion, said inner portion being sandwiched between said cover and said annular sealing member; and an annular gasket having an outer sealing portion and an inner anchored portion, said anchored portion being layer-sandwiched between axially-superposed, parallel portions of said annular shoulder and the central portion of said annular retainer, the outer portion of said annular retainer being substantially coextensive in shape with the sealing portion of said annular gasket and superposed thereon wherein one of the inner and outer peripheral edge portions of said gasket has a locking projection held in locking engagement with said annular retainer; wherein said annular retainer comprises a leaf spring having an axially-disposed annular flange on its inner periphery and an axially-disposed annular wall in between its inner and central portions, said annular flange and said annular wall jointly providing therebetween an annular channel in which said annular sealing member is held; wherein said locking projection comprises an annular inturned lip which is integral with the outer peripheral edge portion of said gasket and which is disposed around and over the outer peripheral portion of the annular retainer, and wherein said outer peripheral portion of said annular retainer is sandwiched between said annular inturned lip and said gasket; and wherein said cover has a skirt depending below the outer periphery of said inturned lip, and wherein the radial distance between said skirt and said lip is less than the radial width of said lip.

2. A fuel tank cap according to claim 1, wherein said annular sealing member comprises a sealing ring and a retaining ring and wherein said retaining ring is disposed between said sealing ring and said annular wall.

3. A fuel tank cap according to claim 1, wherein said cover has a flat central portion extending outwardly beyond said annular wall and the height between the central portion of said retainer and the flat central portion of said cover is larger than one half of the length of the cylindrical portion of said bracket.

4. A fuel tank cap according to claim 1, wherein including a pressure relief valve mechansim mounted on said bracket.

5. A fuel tank cap according to claim 1, wherein said annular sealing member and said annular gasket are made of nitrilebutadiene rubber.

* * * * *

UNITED STATES PATENT AND TRADEMARK OFFICE
CERTIFICATE OF CORRECTION

PATENT NO. : 4,304,339
DATED : December 8, 1981
INVENTOR(S) : Yoshiharu Sakai and Hidetoshi Ogida It is certified that error appears in the above—identified patent and that said Letters Patent is hereby corrected as shown below:

On the title page

[56] References Cited, U.S. PATENT DOCUMENTS, line 3; "Hindley" should read -- Findley -- (Original Letters Patent No. 2,484,083)
[56] References Cited, U.S. PATENT DOCUMENTS, line 7; "Ohsida et al." should read -- Ohgida et al. -- (Original Letters Patent No. 4,051,975.)
Col. 2, line 1; insert -- of -- after "view"
Col. 2, line 66; "conprises" should read -- comprises --
Col. 4, line 2; "agianst" should read -- against --
Col. 4, line 24; "inproper" should read -- improper --
Col. 4, line 25; "timer" should read -- times --
Col. 6, line 4; "mechansim" should read -- mechanism --

Signed and Sealed this

Eighth Day of June 1982

[SEAL]

Attest:

GERALD J. MOSSINGHOFF

Attesting Officer

Commissioner of Patents and Trademarks